(12) United States Patent
Umkehrer et al.

(10) Patent No.: US 11,221,257 B2
(45) Date of Patent: Jan. 11, 2022

(54) TEMPERATURE PROBE

(71) Applicant: Endress + Hauser Wetzer GmbH + Co. KG, Nesselwang (DE)

(72) Inventors: Alfred Umkehrer, Hopferau (DE); Pavo Vrdoljak, Nesselwang (DE); Harald Brundl, Schabhausen (DE); Thomas Harle, Oy-Mittelberg (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 112 days.

(21) Appl. No.: 15/537,909

(22) PCT Filed: Dec. 10, 2015

(86) PCT No.: PCT/EP2015/079291
§ 371 (c)(1),
(2) Date: Jun. 20, 2017

(87) PCT Pub. No.: WO2016/102195
PCT Pub. Date: Jun. 30, 2016

(65) Prior Publication Data
US 2018/0106684 A1    Apr. 19, 2018

(30) Foreign Application Priority Data

Dec. 23, 2014 (DE) .................. 10 2014 119 593.0

(51) Int. Cl.
*G01K 1/20*    (2006.01)
*G01K 7/16*    (2006.01)
(Continued)

(52) U.S. Cl.
CPC .............. *G01K 1/20* (2013.01); *G01K 7/02* (2013.01); *G01K 7/16* (2013.01); *G01K 15/007* (2013.01)

(58) Field of Classification Search
CPC .. G01K 1/20; G01K 7/02; G01K 7/16; G01K 15/007
See application file for complete search history.

(56) References Cited

U.S. PATENT DOCUMENTS 4,075,036 A * 2/1978 Lysikov .............. G21C 17/112
                                                    136/225
4,087,693 A * 5/1978 Brown ..................... G01K 7/04
                                                    250/390.01
(Continued)

FOREIGN PATENT DOCUMENTS

CN      101435725 A     5/2009
CN      101865736 A    10/2010
(Continued)

OTHER PUBLICATIONS

German Search Report, German Patent Office, Munich, DE, dated Sep. 30, 2015.

(Continued)

*Primary Examiner* — Nathaniel T Woodward
*Assistant Examiner* — Philip L Cotey
(74) *Attorney, Agent, or Firm* — Mark A. Logan; Endress+Hauser (USA) Holding Inc.

(57) ABSTRACT

The invention relates to a temperature probe (10) comprising a temperature-dependent measuring element (ME), which measuring element (ME) can be contacted via at least a first connecting line (1) and at least a second connecting line (2), the first connecting line (1) having a first and a second portion (T1, T2), and the first and the second portions (T1, T2) consisting of different materials.

25 Claims, 2 Drawing Sheets

Figure 1:
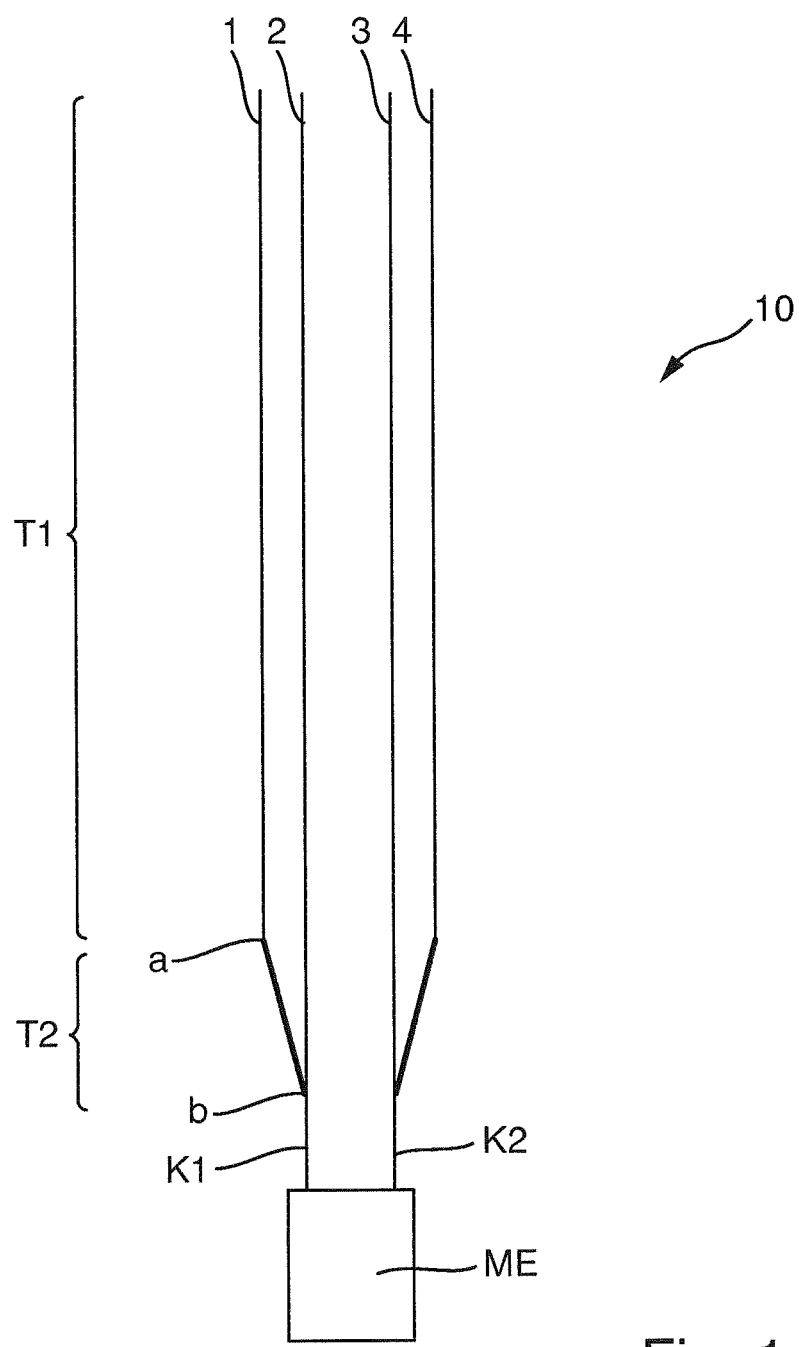

(51) Int. Cl.
*G01K 15/00* (2006.01)
*G01K 7/02* (2021.01)

(56) References Cited

U.S. PATENT DOCUMENTS

| | | | | |
|---|---|---|---|---|
| 4,919,543 | A * | 4/1990 | Davis | G01K 7/02 136/234 |
| 4,989,992 | A * | 2/1991 | Piai | G01K 7/021 374/141 |
| 5,088,835 | A * | 2/1992 | Shigezawa | G01K 7/023 136/230 |
| 5,711,608 | A * | 1/1998 | Finney | G01K 7/02 136/233 |
| 5,887,978 | A | 3/1999 | Lunghofer | |
| 7,044,638 | B2 * | 5/2006 | Phillips | G01K 7/04 374/180 |
| 2004/0255998 | A1 * | 12/2004 | Schuh | G01K 7/13 136/224 |
| 2005/0259719 | A1 * | 11/2005 | Phillips | G01K 7/04 374/179 |
| 2006/0227849 | A1 * | 10/2006 | Phillips | G01K 7/04 374/179 |
| 2009/0124131 | A1 * | 5/2009 | Breunsbach | G01K 7/023 439/652 |
| 2011/0222582 | A1 * | 9/2011 | Subramanian | G01K 17/00 374/179 |
| 2013/0156070 | A1 * | 6/2013 | Reich | G01K 1/026 374/179 |
| 2014/0120636 | A1 * | 5/2014 | Yamaguchi | G01K 7/02 438/5 |
| 2015/0131701 | A1 * | 5/2015 | Hedayat | G01K 7/12 374/180 |
| 2016/0025694 | A1 * | 1/2016 | Bran | G01N 27/185 73/25.03 |
| 2016/0361528 | A1 * | 12/2016 | Kanz | A61B 17/2202 |

FOREIGN PATENT DOCUMENTS

| | | |
|---|---|---|
| CN | 102589739 A | 7/2012 |
| DE | 102005023869 A1 | 12/2005 |
| DE | 69733138 T2 | 2/2006 |
| DE | 102007058410 A1 | 6/2009 |
| DE | 102010003125 B4 | 9/2013 |
| DE | 102014119593 A1 | 6/2016 |
| EP | 0775897 A1 | 5/1997 |
| JP | S59-48628 A | 3/1984 |
| JP | H9-33360 A | 2/1997 |
| WO | 2009/071555 A1 | 6/2009 |

OTHER PUBLICATIONS

International Search Report, EPO, The Netherlands, dated Feb. 22, 2016.
English Translation of the International Preliminary Report on Patentability, WIPO, Geneva, CH, dated Jul. 6, 2017.
Chinese Office Action issued in corresponding Chinese Application No. 201580069290.8, dated Nov. 19, 2018.

* cited by examiner

TEMPERATURE PROBE

The invention relates to a temperature probe, a thermometer, and a method for operating the thermometer, as well as to the use of the temperature probe, thermometer, and method.

From the prior the art, a self-checking temperature sensor is known from patent document DE 69733138 T2. In this, a self-checking sensor with a first thermal pair and a second thermal pair is provided, characterized in that a temperature-dependent element in the form of an impedance element has a first and a second end, wherein the first thermal pair is coupled with the first end, and the second thermal pair is coupled with the second end, and a thermocouple is coupled with the temperature-dependent element between the first and the second ends.

In process automation, thermometers are for measuring the temperature of a process medium. In practice, the sensor element is separated from the process medium via multiple serial thermal resistances (protective tube, coupling, measuring insert protective tube, measuring insert jacket, powder or cast around the sensor). Based upon empirical values, the protective tube is selected in its geometric length such that a complete thermal balance obtains between the sensor and the process medium.

If the thermometer is too short for a complete thermal balance (note: correct length depends upon many factors, such as the difference between the process temperature and the ambient temperature, thermal conductivity of the materials of the thermometer, coupling between the measuring insert and the protective tube, process medium thermal conductivity, process medium flow rate), there is a relatively strong temperature gradient in the last centimeters of the tip of the sensor.

In the literature, there are methods for determining, among other things, the correct process value for equidistant temperature sensors (Klaus Irrgang, Lothar Michalowsky: Temperaturmesspraxis, ISBN-13: 978380272204 ("Practical temperature measurement")). In practice, these are costly, both in terms of sensor design, and in terms of their signal analysis. The construction of the thermometer in point of reproducible performance is, thereby, very challenging.

Apart from thermometers that are designed as too short geometrically, in practice, there can be thermometers that at initial installation make correct measurements, but that later cannot measure correct process temperature anymore if, for example, layers of process medium sediments form on the protective tube or if the thermal coupling between the measuring insert and the protective tube deteriorates.

The following invention makes possible a simple implementation (in sensor structure, as well as in signal analysis) of a relevant diagnostics for resistance thermometers, to determine whether or not, in the area of the tip of the sensor, there is a thermal balance, or whether or not there is a "suspicious" temperature gradient that points to one of the aforementioned measurement problems: In a resistance sensor in a 4-wire circuit, a piece of the connection cable from one of the four connection wires (all of which are located close to the sensor) is replaced with a different material (see FIG. 1), so that, between the connection cables 1 and 2, a thermoelectric voltage can be measured using the Seebeck effect, as soon a temperature gradient is created along the "red wire." Correct measurement of the difference would require knowing the temperature at this point; however, if a pair of materials whose EMF for temperature is relatively constant is selected, it is sufficient, instead, to use the temperature of the resistance sensor ME for approximate detection of the difference temperature. If, in the entire area of the tip of the sensor (which is located along the line a-b), a thermal balance is established, the thermoelectric voltage is zero, and an assessment of the thermocouple is no longer necessary.

In principle, obviously, the rightmost wire could be replaced in an analogous way, but, ideally, with only half of its length. This way, a relatively accurate "prediction" can even be made as to how high the dissipation error is, and the "true process temperature" be determined.

The temperature gradient (heat dissipation error) along the submerged body in which a measuring element is located is determined by an additionally installed thermocouple. The thermocouple is integrated in one or more of the connection cables of the measuring element.

This invention can be implemented in known measuring elements and thermometers, since limbs of the highly suitable type K thermocouple are already used as connection cables. The measurement of the difference temperature can take place via a second channel of a transmitter (measuring transducer) or via a simple multimeter. A special function in the device description, e.g., a DTM, or the firmware of the thermometer can be used to perform monitoring of the temperature gradient and/or to determine if the measured value of the temperature difference suggests a "measurement problem" (among other things, using additional values such as a measured value of the measuring element, an RTD, information about the protective tube, ambient temperature, and information about the process medium).

Historical trend records of the temperature gradients can provide information about a qualitative deterioration of the measurement. This diagnostic could be used (possibly together with other, already available diagnoses).

In an embodiment of the temperature probe, the temperature probe includes a temperature-dependent measuring element, which can be contacted via at least a first connection cable and at least a second connection cable, wherein the first connection cable has a first and a second section, and wherein the first and the second sections are made out of different materials.

In a further embodiment of the temperature probe, the first and the second sections of the first connection cable form a thermocouple.

In a further embodiment of the temperature probe, the second section is arranged between the measuring element and the first section.

In a further embodiment of the temperature probe, the second connection cable is made of the same material as the first section of the first connection cable.

In a further embodiment of the temperature probe, the first connection cable is connected to the second connection cable via the measuring element.

In a further embodiment of the temperature probe, the second connection cable is connected directly to the first connection cable.

In a further embodiment of the temperature probe, the first section of the first connection cable adjoins the second section of the first connection cable, and the second section of the first connection cable adjoins the second connection cable—preferably, electrically connected to one another in each case.

In a further embodiment of the temperature probe, the first and the second connection cables extend along a fitting up to the measuring element, wherein the first section of the first connection cable of a first part runs along this fitting, and wherein the second section of a second part runs along the fitting, and wherein the first and the second parts do not overlap.

In a further embodiment of the temperature probe, the second section extends along a part of the fitting located between the measuring element and the first section of the first connection cable.

In a further embodiment of the temperature probe, the second connection cable extends along a fitting up to the measuring element, or a contact device of the measuring element.

In a further embodiment of the temperature probe, the measuring element includes a first contact device and a second contact device, e.g., in the form of a wire or a soldering point, wherein the first and the second connection cables are connected to the first contact device.

In a further embodiment of the temperature probe, a third connection cable is connected to the second contact device.

In a further embodiment of the temperature probe, a fourth connection cable is connected to the second contact device.

In a further embodiment of the temperature probe, the third connection cable is made of the same material as the first section of the first connection cable and/or the same material as the second connection cable.

In a further embodiment of the temperature probe, the fourth connection cable is made of the same material as the first section of the first connection cable and/or the same material as the second connection cable and/or the same material as the third connection cable.

In a further embodiment of the temperature probe, the measuring element is a temperature-dependent resistor, e.g., a PT100.

In an embodiment of the thermometer, the thermometer includes a temperature probe according to one of the preceding embodiments, additionally including a measuring transducer that is (electrically) connected to the first connection cable and the second connection cable—specifically, a proximal end of the first or the second connection cable.

In a further embodiment of the thermometer, the purpose of the measuring transducer is to record a voltage between the first and the second connection cables, —particularly, the proximal end of the first and the second connection cables.

In a further embodiment of the thermometer, the measuring transducer is connected to the third and/or fourth connection cables—preferably, to the proximal end of the third or fourth connection cable.

In a further embodiment of the thermometer, the measuring transducer is additionally used to record a voltage between the third and the fourth connection cables.

In a further embodiment of the thermometer, the measuring transducer is additionally used to record a voltage between the second and the third connection cables.

In a further embodiment of the thermometer, the measuring transducer is additionally used to record a voltage between the second and the fourth connection cables.

In a further embodiment of the thermometer, a reference value is stored in the measuring transducer (e.g., in a storage unit of the measuring transducer), to compare the voltage present between the first and the second connection cables with the reference value, and, depending upon the comparison, to produce a message that specifies whether or not the voltage between the first and the second connection cables has exceeded the reference value.

In a further embodiment of the thermometer, the measuring transducer includes a communication interface (for, preferably, digital communication) that—via a field bus to which the thermometer is connectable, for example—is used to transfer this message—preferably, regularly or event-triggered.

In a further embodiment of the thermometer, the purpose of the message is to detect heat dissipation or a heat dissipation error along the course of the connection cables, i.e., the fitting, of the measuring element.

In a further embodiment of the thermometer, the measuring transducer is used to determine a measured value from the measured signal of the measuring element.

In a further embodiment of the thermometer, the purpose of the measuring transducer is additionally to correct the measured value as a function of the voltage present between the first and the second connection cables.

In an embodiment of the method, the method for monitoring a thermometer according to one of the preceding embodiments serves the purpose of monitoring a temperature probe according to one of the preceding claims—specifically, a thermometer with a temperature probe according to one of the preceding embodiments.

In an embodiment of the method, a voltage between the first and the second connection cables is recorded.

In an embodiment of the method, the voltage recorded between the first and the second connection cables is compared to a reference value, e.g., a reference voltage.

In an embodiment of the application, the temperature probe, the thermometer, or the method according to at least one of the preceding embodiments is used for determining heat dissipation or a heat dissipation error.

Figure 2:
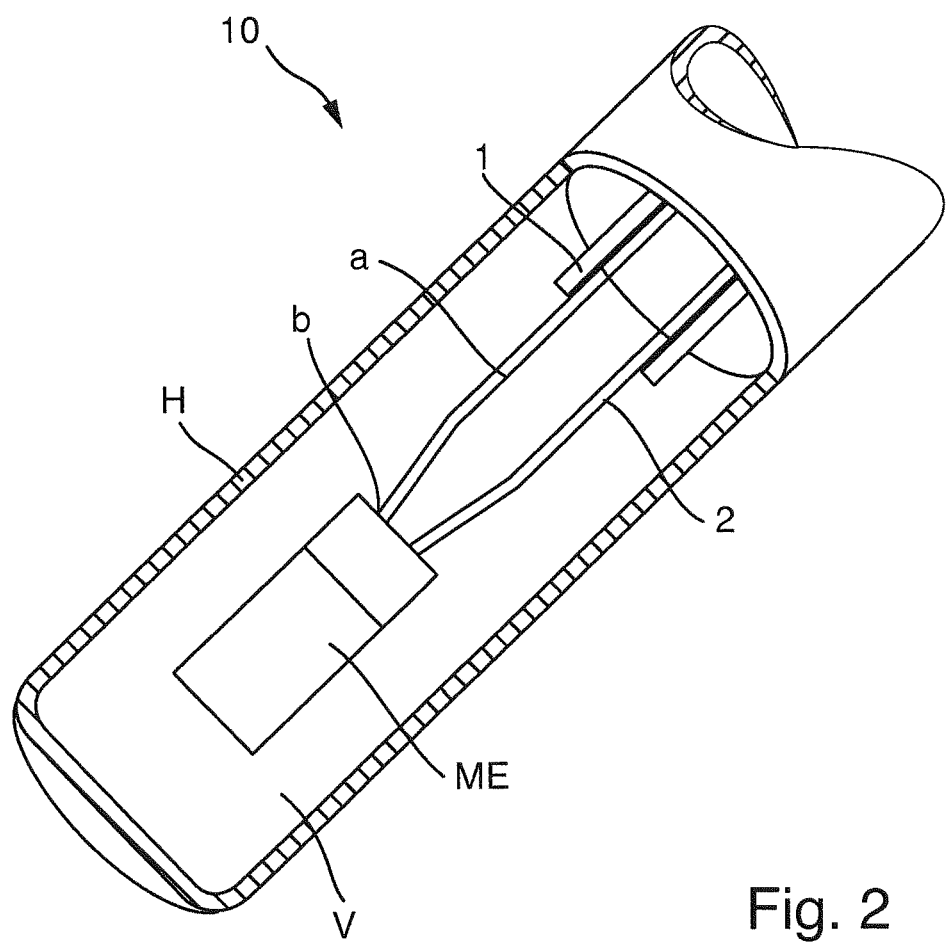

The invention is explained in more detail based upon the following drawings. Illustrated are:

FIG. 1: a schematic representation of an embodiment of a temperature probe,

FIG. 2: a schematic representation of another embodiment of a temperature probe that is arranged in a sleeve, such as immersion body, e.g., in the form of a protective tube.

FIG. 1 shows a temperature probe operated in four-wire technology or four-point measurement. A first, a second, a third, and a fourth connection cable is provided for this purpose. This connection cable extends along a fitting up to a measuring element ME. The first connection cable has a first section T1 that extends along a first part of the fitting, and a second part T2 that extends along the adjoining part of the fitting. The first section is made out of a first material and the second part is made out of another, different material. The pairing of materials is selected in such a way that a thermoelectric effect is produced as a result of the temperature difference between points a and b, should there actually be such a temperature difference between points a and b. At point a, the first section of the first connection cable is connected to the second section. At point b, the second section is connected to the second connection cable and/or the contact device of the measuring element.

Another contact device of the measuring element (for which there is, for instance, a temperature-dependent resistor) is connected to a third and a fourth connection cable. The connection cables form different measurement channels, via which a thermoelectric voltage at the first connection cable or between the ends of the first and the second connection cables can be tapped. Furthermore, another measurement channel between the second and the third connection cables can be provided, to tap a measurement signal corresponding to a temperature using the measuring element.

Due to the arrangement of the first connection point a and the second connection point b at different heights in the fitting, a temperature difference (i.e., a temperature gradient between the height at which point a is located and the height at which point b is located) can be determined.

FIG. 2 shows a temperature probe as, for example, it is used in a measuring insert. Such a measuring insert is either submerged directly in a process medium or placed in a protective tube that protects the measuring insert from the process medium whose temperature is to be determined.

The measuring insert includes a sleeve H (e.g., one that is metallic), in which a filling agent V (e.g., a casting—for instance, from a ceramic material) is arranged. In turn, the filling material V is used to embed the temperature probe—specifically, the measuring element ME and connection cables 1, 2.

The measuring element is at present connected via two connection cables 1, 2. Alternatively, an arrangement with three or four connection cables can be selected, as shown in FIG. 1.

The first connection cable 1 according to FIG. 2 has a first section that is connected via connection point a to a second section. The sections here differ in the materials of which they are made. The second section is connected to the measuring element via connection point b. A second connection cable 2 is also connected to the measuring element (ME). The first connection cable 1 is thereby connected to the second connection cable 2 via the measuring element. As mentioned initially, a thermoelectric voltage can occur as a result of the different material pairing at the connection points a and b. This thermoelectric voltage can be tapped between the connection cables 1, 2 and used for detecting heat dissipation errors.

The section between the connection points a and b is here selected so that, in the installed state, it is located in the lumen of a container, in which there is also a process medium. The temperature probe, together with its sleeve, here can be directly exposed to the process medium, or protected from it with a protective tube. Preferably, the section between the connection points is significantly shorter than the remaining section of the connection cable, e.g., the section between a and b is smaller than half, —preferably, smaller than a third, or a fifth, or a sixth, or a seventh, or an eighth—of the total length T1, T2 of the connection cable 1.

The invention claimed is:

1. A temperature probe, comprising:
   a temperature-dependent resistor;
   a first connection cable having a first section embodied of a first metal and a second section embodied of a second metal;
   a second connection cable embodied of the first metal; and
   a fitting,
   wherein the second section of the first cable is arranged between the temperature-dependent resistor and the first section of the first cable and wherein the second section of the first cable and the second cable contact the temperature-dependent resistor,
   wherein the first and the second connection cables extend along the fitting up to the temperature-dependent resistor,
   wherein the first section of the first connection cable runs along said fitting, the second section runs along said fitting, and the first and the second sections do not overlap, and
   wherein the first and the second sections of the first connection cable form a thermocouple.

2. The temperature probe according to claim 1, wherein the second section of the first connection cable is connected to the second connection cable via the temperature-dependent resistor.

3. The temperature probe according to claim 1, wherein the second connection cable is connected directly to the second section of the first connection cable.

4. The temperature probe according to claim 1, wherein the second section extends along a part of the fitting located between the temperature-dependent resistor and the first section of the first connection cable.

5. The temperature probe according to claim 1, wherein the second connection cable extends along a fitting up to the temperature-dependent resistor or a contact device of the temperature-dependent resistor.

6. The temperature probe according to claim 1, wherein the temperature-dependent resistor includes a first contact device and a second contact device, wherein the second section of the first connection cable and the second connection cable are connected to the first contact device.

7. The temperature probe according to claim 6, further comprising:
   a third connection cable connected to the second contact device.

8. The temperature probe according to claim 7, further comprising:
   a fourth connection cable connected to the second contact device.

9. The temperature probe according to claim 8, wherein the fourth connection cable is made of the same metal as the first section of the first connection cable and/or the same metal as the second connection cable and/or the same metal as the third connection cable.

10. The temperature probe according to claim 7, wherein the third connection cable is made of the same metal as the first section of the first connection cable and/or the same metal as the second connection cable.

11. A thermometer with a temperature probe according to claim 1, additionally including a measuring transducer that is (electrically) connected to the first connection cable and the second connection cable.

12. The thermometer according to claim 11, wherein the purpose of the measuring transducer is to record a voltage between the first and the second connection cables.

13. The thermometer according to claim 11, wherein the measuring transducer is additionally connected to a third and/or fourth connection cables.

14. The thermometer according to claim 13, wherein the purpose of the measuring transducer is additionally to record a voltage between the third and the fourth connection cables.

15. The thermometer according to claim 13, wherein the purpose of the measuring transducer is additionally to record a voltage between the second and the third connection cables.

16. The thermometer according to claim 13, wherein the purpose of the measuring transducer is additionally to record a voltage between the second and the fourth connection cables.

17. The thermometer according to claim 11, wherein a reference value is stored in the measuring transducer for comparing the voltage present between the first and the second connection cables with the reference value, and, depending upon the comparison, for producing a message that specifies whether or not the voltage between the first and the second connection cables has exceeded the reference value.

18. The thermometer according to claim 17, wherein the measuring transducer includes a communication interface that, via a field bus to which the thermometer is connectable, is used to transfer the message.

19. The thermometer according to claim 11 wherein the purpose of the message is to detect heat dissipation or a heat dissipation error along the course of the connection cables.

20. The thermometer according to claim 11, wherein the measuring transducer is used to determine a measured value from the measured signal of the temperature-dependent resistor.

21. The thermometer according to claim 11, wherein the purpose of the measuring transducer is additionally to correct the measured value as a function of the voltage present between the first and the second connection cables.

22. Method for monitoring a temperature probe according to claim 1.

23. Method according to claim 22, wherein a voltage between the first and the second connection cables is recorded.

24. Method according to claim 1, wherein the voltage recorded between the first and the second connection cables is compared to a reference value.

25. Application of the temperature probe of the thermometer or the method according to claim 1 for determining heat dissipation or a heat dissipation error.

\* \* \* \* \*